CURRENT DRIVER CIRCUIT
Filed Jan. 25, 1960
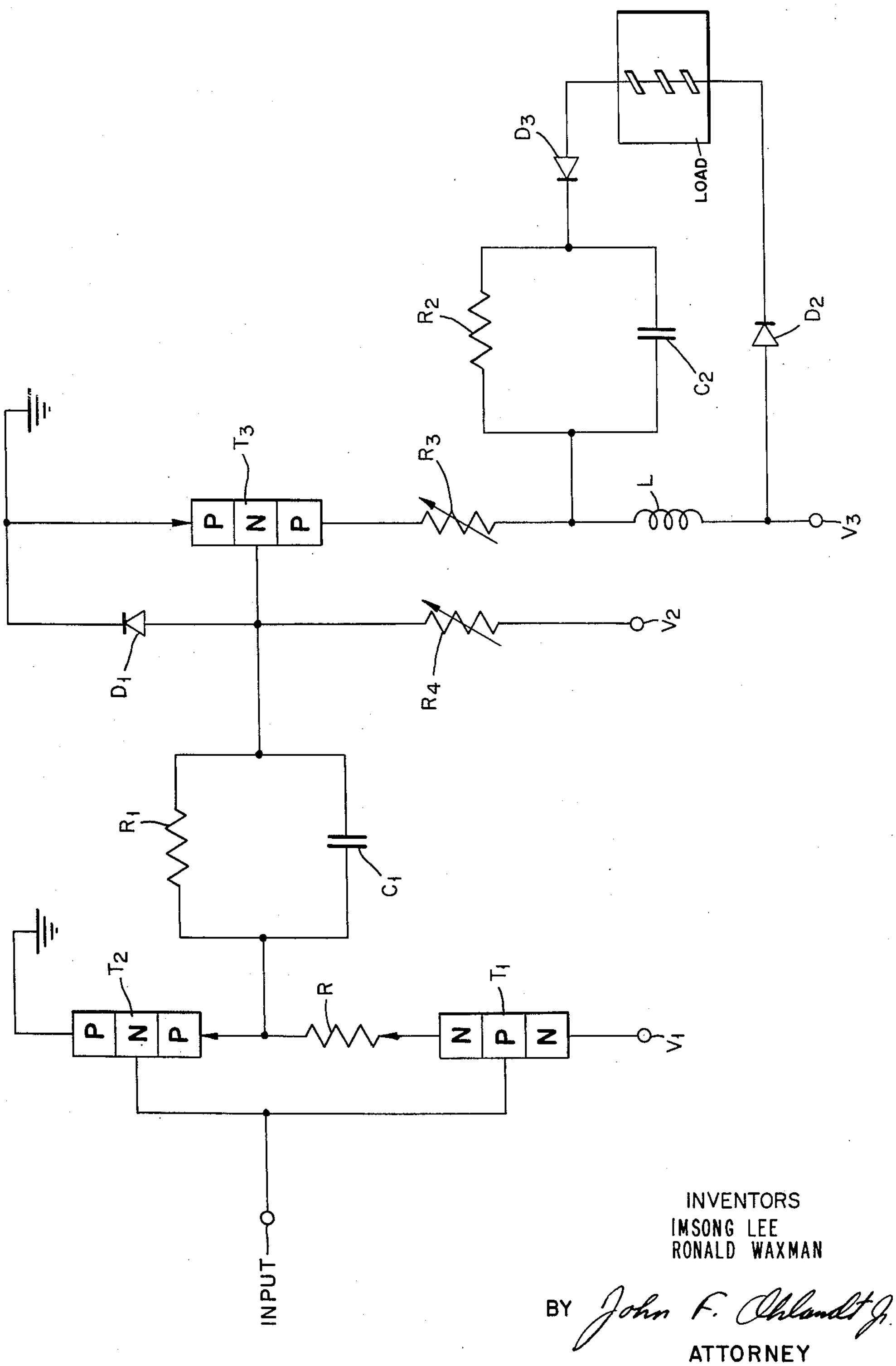
INVENTORS
IMSONG LEE
RONALD WAXMAN
BY John F. Ohlandt Jr.
ATTORNEY United States Patent Office 3,065,358
Patented Nov. 20, 1962

3,065,358

CURRENT DRIVER CIRCUIT

Imsong Lee, Palo Alto, Calif., and Ronald Waxman, Poughkeepsie, N.Y., assignors to International Business Machines Corporation, New York, N.Y., a corporation of New York Filed Jan. 25, 1960, Ser. No. 4,360
7 Claims. (Cl. 307—88)

This invention relates to driver circuits and in particular to current driver circuits useful for driving loads such as magnetic cores.

In the past, the conventional current driving arrangement has been to connect the load directly to the output electrode of a driver element such as a transistor and to supply current pulses to the load when the transistor is driven toward, but not necessarily into, saturation by the application of an input signal. Where the arrangement is of the particular type that forces a constant current through the load regardless of load impedance, the collector voltage of the transistor will be high when load impedance is low since the collector voltage is then determined by the fixed supply potential less the voltage across the load. As a result, the power dissipation requirements for such a transistor driver will be high.

If the conventional driver circuit is of the type that limits current by means of a resistor in series with the load, the load resistance must be much less than the series resistance to obtain the required constant current and, as a result, at least 90% of the supply voltage is wasted.

It is therefore an object of this invention to provide an improved current driver circuit.

Another object of this invention is to provide a driver circuit that will deliver essentially constant high current pulses to a load regardless of load impedance variation.

A further object is to operate the driver element at relatively low power dissipation with a low voltage supply while delivering the required constant current to the load.

The above objects are achieved according to the present invention by the feature of an energy storage device interposed in the driver circuit between the driver element and the load. The storage device is adapted to receive energy when the driver element is placed in its high current or saturation state. By reason of its nature and associated circuitry it will transfer this energy to the load when the driver element is placed in its low current or cutoff state. With this arrangement a 180° phase shift is introduced between the maximum output current from the driver element and the maximum load current. The value of load current is set by the output current which has been permitted to flow under saturation conditions and is made independent of load variations. Moreover, during the time that current is being transferred to the load, output current from the driver element is a minimum and during the time that current is being delivered to the energy storage device, the output voltage of the driver element is a minimum. Thus, the power dissipation of the driver element is greatly reduced. It is determined by the duty factor of on and off transients which in most practical cases is very small compared to total time on and total time off per cycle.

The foregoing and other objects, features and advantages of the invention will be apparent from the following more particular description of a preferred embodiment of the invention, as illustrated in the accompanying drawings.

Referring now to the FIGURE, a preferred embodiment is shown wherein transistors $T_1$ and $T_2$ are arranged in a complementary emitter follower circuit for delivering the input signal to the base of the transistor driver element $T_3$. $V_1$, $V_2$ and $V_3$ are the supply voltages for the several transistors. Resistors $R_1$ and $R_4$ provide the voltage divider necessary for on and off D.C. conditions. $R_4$ is variable to permit adjustment of the saturation of $T_3$. Capacitor $C_1$ provides an overdrive path for turn off of $T_3$. Diode $D_1$ protects transistor $T_3$ from more than the allowable reverse bias specified for the particular transistor. In the output circuit of $T_3$, variable resistor $R_3$ serves to limit the collector current to the desired value and inductor L, the energy storage element, insures that a constant current will be applied to the load. Inductor L is connected to the load through the parallel combination of resistor $R_2$ and capacitor $C_2$ and through a pair of diodes $D_2$ and $D_3$. Diodes $D_2$ and $D_3$ permit current flow to the load only when $T_3$ is in the cutoff state.

In operation, transistor $T_3$ is normally in the saturated state i.e. a high value of output current flows from the collector of $T_3$ through $R_3$ and the inductor L. However, no current flows to the load at this time because $D_2$ and $D_3$ are reverse biased. When a positive signal is applied to the base of $T_1$ and $T_2$, $T_2$ turns off and allows $T_1$ to pass enough current to take $T_3$ out of saturation and fully turn off $T_3$ in less than 0.1 micro-second. As $T_3$ turns off, a voltage is induced in inductor L in such a direction as to maintain the current flow in its original direction in accordance with a fundamental principle. The direction of this induced voltage is opposite to the previous direction of the voltage across L. Since the path through $T_3$ is now effectively blocked, the only discharge path for the current is through the load, the diodes $D_2$ and $D_3$ and the parallel combination of $R_2$ and $C_2$. By choosing L so that the time constant L/R load is large compared to the desired duration of the pulse, a relatively constant output pulse will be obtained. When the input pulse from $T_1$ decays, $T_3$ will turn on immediately since $T_2$ will function as a low impedance path for the discharge of $C_1$.

In addition to their function of permitting current flow to the load only when $T_3$ is cut off, diodes $D_2$ and $D_3$, by virtue of the reverse bias placed on them by the voltage present on the $R_2$ $C_2$ combination, also serve to block current through the load in the situation where the load is made up of magnetic cores and voltages are being induced when the cores are receiving inputs to other windings. This reverse bias is small enough to be easily overcome by L during current pulse time. Of course, $R_2$ and $C_2$ may be eliminated where the load to be driven is non-magnetic.

Typical values of components as well as measurements taken in the final testing of the driver circuit of the present invention are as follows:

$V_1=+20$ v.
$V_2=-20$ v.
$V_3=-20$ v.
R=20Ω
$R_1=510\Omega$
$R_2=200\Omega$
$R_3=50\Omega$
$R_4=5K$
$C_1=5000$ μμf.
$C_2=2$ μf.
L=600 μhenry
$T_3$—Texas Instruments 2N1046 power transistor
Load—Core load of approximately 40 toroids and multipaths
Pulse repitition rate—500 kc.
Peak load current—500 ma.
Pulse rise time—0.2 μs.
Fall time—0.3 μs.
Pulse width at base of pulse—0.5 μs.

While the invention has been particularly shown and described with reference to a preferred embodiment thereof, it will be understood by those skilled in the art that various changes in form and details may be made therein without departing from the spirit and scope of the invention.

What is claimed is:

1. A driver circuit for supplying constant current pulses to a load regardless of the impedance variations of said load comprising a driver element operable to provide only a high value of unidirectional output current or a low value of unidirectional output current defining respectively an on and off state for said driver element, means for regulating the state of said driver element, an energy storage device coupled to said driver element for receiving current from said driver element only when said driver element is in its on state, and means for transferring said current from said energy storage device to said load only when said driver element changes from its on to its off state.

2. A driver circuit for supplying constant current pulses to a load regardless of the impedance variations of said load comprising a driver element having only a high unidirectional output current state and a low unidirectional output current state corresponding respectively to an on and off state for said driver element, means for alternately operating said driver element in its on or off state, an inductive energy storage device coupled to said driver element for receiving current only when said driver element is in its on state and means for transferring said current from said energy storage device to said load responsive only to a change from the one to the off state by said driver element, the ratio of the inductance of said storage device to the resistance of said load being large.

3. A driver circuit for supplying constant current pulses to a load regardless of the impedance variations of said load comprising, a driver element, means for operating said driver element only in a first state where substantially no output current flows through said driver element or in a second state where a high level of output current flows through said driver element, means for regulating the state of said driver element including means for biasing said driver element to its high current state in the absence of an input signal to said driver element and means for switching said driver element to its substantially no current state in the presence of an input signal, an inductive energy storage device coupled to said driver element for receiving current only when said driver element is in its high current state, and means for transferring said current from said inductive energy storage device to a load responsive only to a change from the high current state to the substantially no current state by said driver element.

4. A driver circuit comprising a transistor driver element operable only in either its saturation or cutoff state and having an input and an output, means for biasing said transistor element to its saturation state in the absence of a signal to its input, an inductor connected to the output of said transistor driver element, a load, means for connecting said inductor to said load including means for permitting current flow to said load only when the voltage across said inductor is of a polarity corresponding to the cutoff state of said transistor driver element, and means for driving said transistor element to its cutoff state responsive to a signal to its input.

5. A driver circuit as defined in claim 4 wherein said means for permitting current flow comprises a pair of diodes.

6. A driver circuit as defined in claim 5 wherein said load comprises a group of magnetic cores.

7. A driver circuit as defined in claim 6 further comprising a resistor and capacitor network for slightly biasing said diodes whereby current flow due to voltages induced in said load is prevented.

References Cited in the file of this patent

UNITED STATES PATENTS

| | | |
|---|---|---|
| 2,924,744 | Paynter | Feb. 9, 1960 |
| 2,933,642 | Marley | Apr. 19, 1960 |